Patented Aug. 5, 1952

2,606,100

UNITED STATES PATENT OFFICE 2,606,100

PRODUCTION OF LITHIUM HYDRIDE

Peter P. Alexander, Beverly, Mass., assignor to Metal Hydrides Incorporated, Beverly, Mass., a corporation of Massachusetts No Drawing. Application May 14, 1949, Serial No. 93,411

12 Claims. (Cl. 23—204)

Lithium aluminum hydride is a valuable reagent for use in the synthesis of many organic compounds. Its use for this and similar purposes is restricted by its high cost. This double hydride is produced by reacting lithium hydride with a solution of an aluminum halide, such as aluminum chloride or bromide, in an ether having a low boiling point, the solution being agitated to maintain the lithium hydride in suspension. The reaction is represented by the following equation:

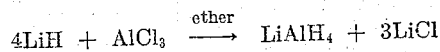

$$4LiH + AlCl_3 \xrightarrow{ether} LiAlH_4 + 3LiCl$$

The lithium aluminum hydride is obtained as a solution in the ether and the lithium chloride is precipitated as a solid. In practice a substantial amount of lithium hydride in excess of the theoretical amount is required. Thus, more than four molecules of lithium hydride is required to produce one molecule of lithium aluminum hydride. The major portion of the lithium used is converted to lithium halide. The high cost of lithium aluminum hydride is due principally to the large amount of lithium hydride required and the high cost of the latter. The present cost of lithium hydride is about twenty-five times that of the lithium halide residue of the reaction.

The present invention contemplates a low cost method for recovering the lithium from the halide residue of the above reaction as lithium hydride.

It had previously been proposed to subject lithium chloride to electrolysis to obtain lithium metal. This was converted to lithium hydride by heating in the presence of hydrogen. Lithium hydride produced in this manner is expensive.

The published results of research conducted by the National Research Corporation between March and December 1943 for the Office of Scientific Research and Development indicate that lithium chloride cannot be reduced to lithium metal by vacuum thermal reduction using ferrosilicon, magnesium or aluminum as reducing agents. The reaction which was desired may be represented by the following equation:

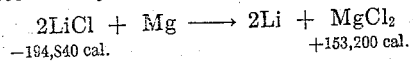

$$2LiCl + Mg \longrightarrow 2Li + MgCl_2$$
$$-194,840 \text{ cal.} \qquad\qquad +153,200 \text{ cal.}$$

The heat of dissociation of lithium chloride is 97,420 calories and the heat of formation of magnesium chloride is 153,200 calories. Since two molecules of lithium chloride are required, there is a deficiency of 41,640 calories. This probably is the reason the reaction did not take place.

The present invention is based upon the idea of conducting the thermal reduction of a lithium halide under conditions such that lithium hydride is formed instead of lithium metal, the heat of formation of lithium hydride coupled with that of the metal halide formed being sufficient to cause the reaction to take place and proceed to completion. The reaction may be represented by the following equation:

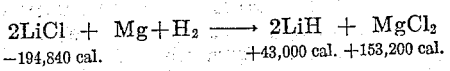

$$2LiCl + Mg + H_2 \longrightarrow 2LiH + MgCl_2$$
$$-194,840 \text{ cal.} \qquad +43,000 \text{ cal.} +153,200 \text{ cal.}$$

Thus, due to the formation of lithium hydride there is an excess of 1360 calories.

In the course of my investigations a mixture of lithium chloride and magnesium in finely divided form in stoichiometrical proportions was tamped in a cup-shaped crucible and was heated in a hydrogen atmosphere to a temperature of about 800° C. and thereafter the molten mass was permitted to solidify by cooling very slowly in a hydrogen atmosphere over a period of several hours. The solidified mass then was removed from the crucible and examined. It was found that the top layer about 1 mm. thick was lithium hydride. A similar thin layer of lithium hydride was formed upon the side of the mass. The interior of the mass was not reduced.

In the practice of the invention it is necessary to bring each particle of the lithium halide, such as lithium chloride, bromide, etc., in effective simultaneous contact with hydrogen and the reducing agent in order that the reaction may proceed as illustrated by the third equation above. This can be accomplished by melting the reaction mixture in an atmosphere of hydrogen and permitting the molten mass to spread out in a thin film about 1 mm. or less thick. The rate of reaction may be increased by decreasing the thickness of the film. To reduce the viscosity of the molten mass, a temperature of about 800° C. is preferred but a higher temperature may be used. The temperature, however, should be below the dissociation temperature of lithium hydride in hydrogen. The necessary effective simultaneous contact can be obtained by suitable agitation of the molten mass in an atmosphere of hydrogen, as by baffles on the wall of a slowly rotating drum, or by spraying the molten mass into an atmosphere of hydrogen.

As reducing agents, I may use magnesium, calcium or barium slightly in excess of the amount theoretically required. I also may use the hydrides of calcium or barium but prefer the metals themselves. When the reducing agent used is magnesium, I prefer to mix the lithium halide and solid reducing agent intimately and then press the mixture to form small briquettes. I have used a pressure as high as 20,000 pounds per square inch. Briquetting has no advantage if the reaction is to be effected by agitation or spraying of the molten mass in hydrogen.

In order to obtain the necessary effective simultaneous contact of the particles of lithium halide with hydrogen and the reducing metal, a thin film or its substantial equivalent appears to be essential. Thus, by heating the reaction mixture in a hydrogen atmosphere to melt at least the lithium halide and permitting the molten mass to spread out in a thin film of 1 mm. or less thick the desired reaction takes place. The substantial equivalent of this thin film may be obtained in other ways as by spraying the molten mass into an atmosphere of hydrogen or by suitable agitation of the molten mass in hydrogen.

It is advantageous to include in the charge a finely divided material of higher melting point than the other essential components. Such a material facilitates the reaction. The lithium hydride present in the lithium halide residue from the producton of lithium aluminum hydride serves as such a material. Other illustrative materials suitable for this purpose are the hydrides of zirconium, titanium, tantalum, etc. The latter also serve to evolve hydrogen in situ at the reaction temperature, leaving the particles of high melting point metal as spacer elements. The evolution of hydrogen in situ assists in bringing about the required effective simultaneous contact between the lithium halide, hydrogen and reducng agent.

The lithium halide residue obtained from the production of lithium aluminum hydride is especially suitable for conversion to lithium hydride by the method of the present invention because its lithium halide content is anhydrous. Consequently, this residue may be used directly without preliminary processing except to remove residual ether which is desirable in order to recover the ether. This residue contains a small amount of lithium hydride, usually about 3 to 5 per cent by weight. The presence of this lithium hydride facilitates the reaction in accordance with the invention. It, of course, is important to preserve and recover this as well as to convert the lithium halide to lithium hydride. This is accomplished by the method of the invention.

The lithium hydride may be separated from the halide of the reducing metal by taking advantage of their different densities. Thus, the reaction mass may be melted and the lighter layer of lithium hydride may be separated from the layer of metal halide or the molten mass may be subjected to the action of centrifugal force. Any inert metal present, such as zirconium, may be removed from the metal halide by dissolving the latter with acid. When the lithium hydride is to be used in the production of lithium aluminum hydride, separation from the metal halide is not necessary. The presence of the metal halide is not detrimental and even a small amount facilitates the grinding of the lithium hydride to finely divided form. A partial separation may be desirable to reduce bulk. The amount of metal halide relative to that of lithium hydride increases with repeated reuse in producing lithium aluminum hydride and reconversion of the lithium halide residue. By melting the reaction product, the lithium hydride may be floated off.

The invention is illustrated further by the following specific example. 8.4 grams of finely divided anhydrous lithium chloride was intimately mixed with 2.4 grams of magnesium powder of about 100 mesh. This mixture was pressed in a mold under a pressure of 20,000 pounds per square inch to form a self-sustaining briquette two inches long, one half inch wide and three sixteenths of an inch thick. This briquette was placed in a flat bottom boat four inches long and one inch wide and the boat placed in a closed furnace. The furnace was evacuated to remove air and moisture while being heated to about 200° C. The vacuum then was disconnected and hydrogen introduced and the furnace heated to 800° C. The furnace then was permitted to cool slowly, about one hour being required to reduce the temperature to 600° C. After the furnace had cooled to about room temperature, the boat was removed. The briquette had melted and spread out over the entire bottom of the boat. The lithium chloride had been converted to lithium hydride, the yield of the latter being 90 per cent.

I claim:

1. The method of producing lithium hydride which comprises mixing a lithium halide with a reducing agent selected from the group consisting of magnesium, calcium, barium and the hydrides of calcium and barium, heating the mixture in an atmosphere of hydrogen above the melting temperature of the lithium halide but below the dissociation temperature of lithium hydride in hydrogen to form a molten mass containing said reducing agent, and exposing the molten mass in the form of a thin film to the action of said hydrogen to convert the lithium halide to lithium hydride.

2. The method of producing lithium hydride which comprises mixing lithium chloride and magnesium, heating the mixture in an atmosphere of hydrogen above the melting temperature of lithium chloride but below the dissociation temperature of lithium hydride in hydrogen to form a molten mass, and exposing the molten mass in the form of a thin film to the action of said hydrogen to convert the lithium chloride to lithium hydride.

3. The method of recovering lithium as lithium hydride from a lithium halide residue containing a small amount of lithium hydride which comprises mixing the lithium halide residue with a reducing agent selected from the group consisting of magnesium, calcium, barium and the hydrides of calcium and barium, heating the mixture in an atmosphere of hydrogen above the melting temperature of the lithium halide but below the dissociation temperature of lithium hydride in hydrogen to form a molten mass containing said reducing agent, and exposing the molten mass in the form of a thin film to the action of said hydrogen to convert the lithium halide to lithium hydride.

4. The method of recovering lithium as lithium hydride from a lithium chloride residue containing a small amount of lithium hydride which comprises mixing the lithium chloride residue with a reducing agent selected from the group consisting of magnesium, calcium, barium and the hydrides of calcium and barium, heating the mixture in an atmosphere of hydrogen above the melting temperature of the lithium chloride but below the dissociation temperature of lithium hydride in hydrogen to form a molten mass, and exposing the molten mass in the form of a thin film to the action of said hydrogen to convert the lithium chloride to lithium hydride.

5. The method of recovering lithium as lithium hydride from a lithium chloride residue containing a small amount of lithium hydride which comprises mixing the lithium chloride residue with magnesium, heating the mixture in an atmosphere of hydrogen above the melting temperature of lithium chloride but below the dissociation temperature of lithium hydride in hydrogen to form a molten mass, and exposing the molten mass in the form of a thin film to the action of said hydrogen to convert the lithium chloride to lithium hydride.

6. The method of recovering lithium as lithium hydride from a lithium chloride residue containing a small amount of lithium hydride which comprises mixing the lithium chloride residue with calcium, heating the mixture in an atmosphere of hydrogen above the melting temperature of lithium chloride but below the dissociation temperature of lithium hydride in hydrogen to form a molten mass, and exposing the molten mass in the form of a thin film to the action of said hydrogen to convert the lithium chloride to lithium hydride.

7. The method of recovering lithium as lithium hydride from a lithium chloride residue containing a small amount of lithium hydride which comprises mixing the lithium chloride residue with barium, heating the mixture in an atmosphere of hydrogen above the melting temperature of lithium chloride but below the dissociation temperature of lithium hydride in hydrogen to form a molten mass, and exposing the molten mass in the form of a thin film to the action of said hydrogen to convert the lithium chloride to lithium hydride.

8. The method of recovering lithium as lithium hydride from a lithium halide residue containing a small amount of lithium hydride which comprises mixing the lithium halide residue with a solid reducing agent and a metal hydride, heating the mixture in an atmosphere of hydrogen above the melting temperature of the lithium halide but below the dissociation temperature of lithium hydride in hydrogen to form a molten mass, and exposing the molten mass in the form of a thin film to the action of said hydrogen to convert the halide to hydride, said metal hydride being that of a metal having a melting point higher than the temperature of the reaction, said reducing agent being selected from the group consisting of magnesium, calcium, barium and the hydrides of calcium and barium.

9. The method of recovering lithium as lithium hydride from a lithium chloride residue containing a small amount of lithium hydride which comprises mixing the lithium chloride residue with a solid reducing agent and a metal hydride, heating the mixture in an atmosphere of hydrogen above the melting temperature of the lithium chloride but below the dissociation temperature of lithium hydride in hydrogen to form a molten mass, and exposing the molten mass in the form of a thin film to the action of said hydrogen to convert the chloride to hydride, said metal hydride being that of a metal having a melting point higher than the temperature of the reaction, said reducing agent being selected from the group consisting of magnesium, calcium, barium and the hydrides of calcium and barium.

10. The method of recovering lithium as lithium hydride from a lithium chloride residue containing a small amount of lithium hydride which comprises mixing the lithium chloride residue with magnesium and a metal hydride, heating the mixture in an atmosphere of hydrogen above the melting temperature of the lithium chloride but below the dissociation temperature of lithium hydride in hydrogen to form a molten mass, and exposing the molten mass in the form of a thin film to the action of said hydrogen to convert the chloride to hydride, said metal hydride being that of a metal having a melting point higher than the temperature of the reaction.

11. The method of recovering lithium as lithium hydride from a lithium chloride residue containing a small amount of lithium hydride which comprises mixing the lithium chloride residue with calcium and a metal hydride, heating the mixture in an atmosphere of hydrogen above the melting temperature of the lithium chloride but below the dissociation temperature of lithium hydride in hydrogen to form a molten mass, and exposing the molten mass in the form of a thin film to the action of said hydrogen to convert the chloride to hydride, said metal hydride being that of a metal having a melting point higher than the temperature of the reaction.

12. The method of recovering lithium as lithium hydride from a lithium chloride residue containing a small amount of lithium hydride which comprises mixing the lithium chloride residue with barium and a metal hydride, heating the mixture in an atmosphere of hydrogen above the melting temperature of the lithium chloride but below the dissociation temperature of lithium hydride in hydrogen to form a molten mass, and exposing the molten mass in the form of a thin film to the action of said hydrogen to convert the chloride to hydride, said metal hydride being that of a metal having a melting point higher than the temperature of the reaction.

PETER P. ALEXANDER.

REFERENCES CITED

The following references are of record in the file of this patent:

UNITED STATES PATENTS

| Number | Name | Date |
| --- | --- | --- |
| 800,380 | Machalske | Sept. 26, 1905 |
| 1,796,265 | Freudenberg | Mar. 10, 1931 |
| 2,082,134 | Alexander | June 1, 1937 |
| 2,408,748 | Alexander | Oct. 8, 1946 |
| 2,450,266 | Alexander | Sept. 28, 1948 |